United States Patent
Slavov et al.

(10) Patent No.: US 10,284,562 B2
(45) Date of Patent: May 7, 2019

(54) DEVICE AUTHENTICATION TO CAPILLARY GATEWAY

(71) Applicant: TELEFONAKTIEBOLAGET LM ERICSSON (PUBL), Stockholm (SE)

(72) Inventors: Kristian Slavov, Espoo (FI); Patrik Salmela, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 172 days.

(21) Appl. No.: 15/311,397

(22) PCT Filed: May 16, 2014

(86) PCT No.: PCT/SE2014/050607
§ 371 (c)(1),
(2) Date: Nov. 15, 2016

(87) PCT Pub. No.: WO2015/174903
PCT Pub. Date: Nov. 19, 2015

(65) Prior Publication Data
US 2017/0093868 A1 Mar. 30, 2017

(51) Int. Cl.
*H04L 29/06* (2006.01)
*H04W 4/70* (2018.01)
(Continued)

(52) U.S. Cl.
CPC .......... *H04L 63/10* (2013.01); *H04L 63/0823* (2013.01); *H04L 67/12* (2013.01);
(Continued)

(58) Field of Classification Search
CPC ................................ H04L 63/10; H04W 4/70
(Continued)

(56) References Cited

U.S. PATENT DOCUMENTS

| 2003/0167392 | A1 | 9/2003 | Fransdonk | |
| 2008/0235768 | A1* | 9/2008 | Walter | H04L 63/08 726/3 |
| 2018/0063133 | A1* | 3/2018 | Zhang | H04L 63/08 |

FOREIGN PATENT DOCUMENTS

| WO | 2011082150 A1 | 7/2011 |
| WO | 2011112683 A1 | 9/2011 |

(Continued)

OTHER PUBLICATIONS

Extended European Search Report dated May 12, 2017, issued in European Patent Application No. 14892007.7, 10 pages.
(Continued)

*Primary Examiner* — Anthony D Brown
(74) *Attorney, Agent, or Firm* — Rothwell, Figg, Ernst & Manbeck, P.C.

(57) ABSTRACT

It is disclosed a method and a capillary gateway, CGW, (50, 60, 204, 304) capable to determine whether to allow a first machine-to-machine, M2M, device network access. The CGW is adapted to intercept (310) an authentication request message sent from a M2M device, and intercept (318) an authentication response message sent from a M2M management service. If the CGW determines that the authentication is successful based on the authentication response message and that there is a valid subscription for the M2M device and the authentication response message is received from a trusted management service, the CGW may allow (414) the first M2M device network access. Embodiments of the present disclosure have the advantage that disclosure can provide low-powered devices Internet reachability based on user subscriptions in non-traditional scenarios such as where devices are deployed straight out-of-the-box, i.e., without any customization.

25 Claims, 4 Drawing Sheets

(51) Int. Cl.
| | |
|---|---|
| *H04W 4/50* | (2018.01) |
| *H04W 12/06* | (2009.01) |
| *H04W 48/02* | (2009.01) |
| *H04L 29/08* | (2006.01) |
| *H04W 12/08* | (2009.01) |
| *H04W 88/16* | (2009.01) |
| *H04W 8/18* | (2009.01) |
| *H04W 84/12* | (2009.01) |

(52) U.S. Cl.
CPC ............... *H04W 4/50* (2018.02); *H04W 4/70* (2018.02); *H04W 12/06* (2013.01); *H04W 12/08* (2013.01); *H04W 48/02* (2013.01); *H04W 8/18* (2013.01); *H04W 84/12* (2013.01); *H04W 88/16* (2013.01)

(58) Field of Classification Search
USPC ............................................................ 726/4
See application file for complete search history.

(56) References Cited

FOREIGN PATENT DOCUMENTS

| | | |
|---|---|---|
| WO | 2012118711 A2 | 9/2012 |
| WO | 2013106188 A2 | 7/2013 |
| WO | 2014011997 A1 | 1/2014 |

OTHER PUBLICATIONS

International Search Report and Written Opinion dated Jan. 22, 2015, in International Application No. PCT/SE2014/050607, 10 pages.

European Communication dated Jan. 11, 2019, issued in European Patent Application No. 14892007.7, 8 pages.

* cited by examiner

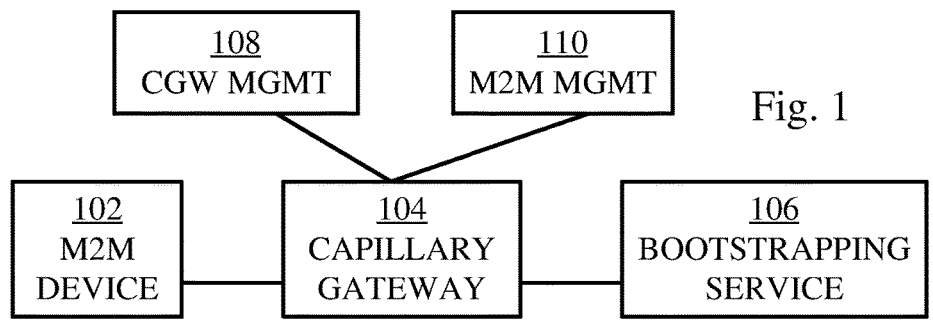
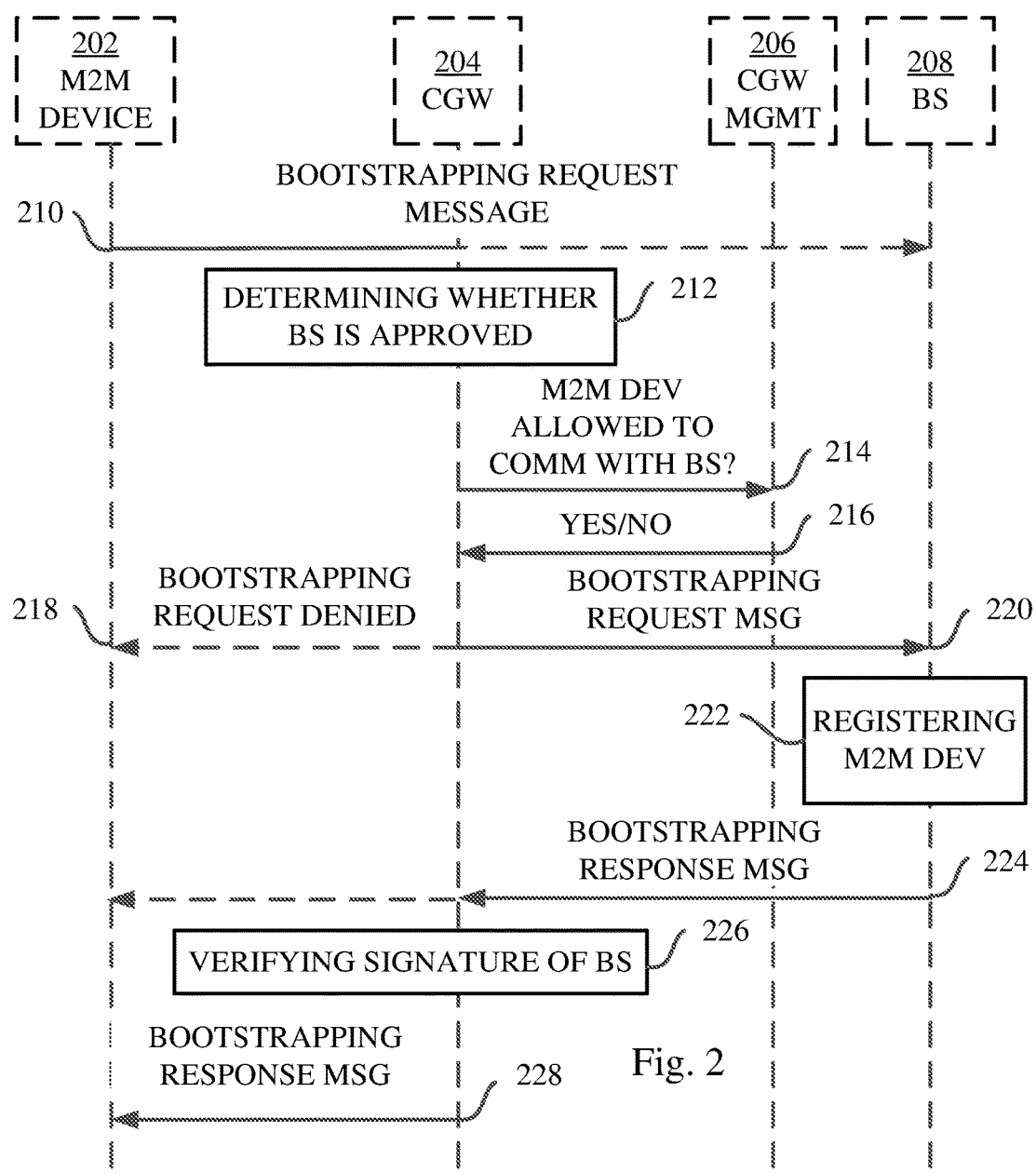

DEVICE AUTHENTICATION TO CAPILLARY GATEWAY

CROSS REFERENCE TO RELATED APPLICATION(S)

This application is a 35 U.S.C. § 371 National Phase Entry Application from PCT/SE2014/050607, filed May 16, 2014, designating the United States, the disclosure of which is incorporated herein in its entirety by reference.

TECHNICAL FIELD

This disclosure relates to authentication of constrained devices. In more particular, it relates to a method and a capillary gateway (CGW) for determining whether to allow a first machine-to-machine (M2M) device network access.

BACKGROUND

For Internet of things (IoT)/M2M the amount of devices that need to be managed will be very big which makes the usability of the management solution an important factor. A natural solution is to have a centralized point from which the devices are managed. One such approach is to have a management web portal to which devices register and are managed from, instead of managing each device directly.

Capillary networks comprise constrained machine devices connected to the public network through a CGW, which in many cases use $3^{rd}$ generation partnership project (3GPP) access technologies towards the public network, and low power radio towards the capillary devices. The constrained devices in the capillary networks have limited, and varying, computational and power resources. In addition, in an IoT scenario, the amount of capillary devices that will be deployed is huge which makes ease of use and deployment a key factor for the success of the IoT. This also means that the amount of manual configuration that is needed to deploy such devices should be minimized. Furthermore, to provide the best possible service, the CGW should restrict the devices accessing through it to only authorized devices as unauthorized devices would otherwise consume the resources of the CGW, possibly lessening the quality of service for authorized devices.

Constrained devices are often deployed to be connected to the public network through a CGW. Some of these CGWs may have to provide connectivity to other devices connecting to them, similar to a public wireless local area network (WLAN) hot spots.

However, for reasons of bandwidth allocation, network isolation and/or security issues, the CGW operator or owner, may wish to limit the service to devices and/or device owners, with which the CGW operator has a business agreement. Since the number of deployments is huge in IoT, manually configuring the connectivity for each device separately is not attractive.

Presently, one way of implementing authentication of a device to a CGW is by using a shared secret or a client side certificate. A shared secret, essentially a username/password pair, requires manual work during deployment, and requires CGW to have an interface for adding new credentials/devices. This by itself does not remove the burden of having to prove who owns the device. Effectively identifying the owner relies on trusting that whoever uses the interface can assure a linkage between the device and its owner. However, when a device is moving and connects to different CGWs over time, this would require that all possible CGWs to which the device will connect would have to be configured to accept the device.

Furthermore, all new interfaces should be treated as potential hazards, and will require their own security solution.

Client side certificates, on the other hand, require a trusted third party to act as a certificate authority. The CGW would have to trust that authority. This would not be a problem if the authority is one of the established authorities. This solution suffers from the same problem as the shared secret does; the client certificate only authenticates the device.

It would be infeasible to also provide the name of the owner in the client certificate, for the reason that such information would become outdated on second hand markets.

3GPP Generic bootstrapping architecture (GBA), as defined in technical specification (TS) 33.220, vers. 12.2.0, defines a mechanism of setting up a shared secret between a User equipment (UE) and an application server, referred to as a Network application function (NAF). GBA is one possible way of authenticating a device to a service. Other options include, but are not limited to, e.g. public key certificates and username/password based authentication.

By bootstrapping an IoT device to a management portal, typically performed during a bootstrapping procedure of the device, remotely managing of the device is enabled.

However, there is a need to provide a procedure with which a machine device can be bound to a subscription in the CGW for network connectivity with minimal user interaction and minimal requirements on the machine device.

SUMMARY

It is an object of embodiments of the invention to address at least some of the issues outlined above, and this object and others are achieved by a capillary gateway, and a method for allowing a first device network access, according to the appended independent claims, and by the embodiments according to the dependent claims.

According to a first aspect, this disclosure provides a method in a CGW for determining whether to allow a first M2M network access. The method comprises intercepting an authentication request of the first M2M device, the authentication request being directed to a management service of the first M2M device, and wherein the authentication request comprises identity information of the first M2M device, and intercepting an authentication response, sent from a management service of M2M devices and directed to a second M2M device, the authentication response comprising identity information of the second M2M device. Also, the method comprises checking whether the authentication response is directed to the same M2M device that sent the authentication request. Also, the method comprises checking whether authentication of the first M2M device was successful, based on the intercepted authentication response. Also, the method comprises checking whether the authentication response is validly signed by the management service of M2M devices, and that a therefore used certificate is trusted by the CGW. Also, the method comprises checking whether there is a valid subscription for the first M2M device. In addition, when there is a valid subscription for the first M2M device, and the authentication response comprising information about the successful authentication, is directed to the same M2M device that sent the authentication request, and the authentication response is signed by using the trusted certificate, the method comprises allowing the first M2M device network access.

According to a second aspect, this disclosure provides a CGW that is capable to determine whether to allow a first M2M device network access. The CGW comprises a processor and a memory that stores a computer program comprising computer program code which when run in the processor, causes the CGW intercept an authentication request of the first M2M device, where the authentication request is directed to a management service of the first M2M device, and where the authentication request comprises identity information of the first M2M device. It also causes the CGW to intercept an authentication response, sent from a management service of M2M devices and directed to a second M2M device, where the response comprises identity information of the second M2M device. When the computer program is run in the processor it also causes the CGW to check whether the authentication response is directed to the same M2M device that sent the authentication request. Furthermore, it also causes the CGW to check whether authentication of the first M2M device was successful, based on the intercepted authentication response. Also, when the computer program is run in the processor it also causes the CGW to check whether the authentication response is validly signed by the management service of M2M devices, and that a therefore used certificate is trusted by the CGW. Also, when the computer program is run in the processor it also causes the CGW to check whether there is a valid subscription for the first M2M device. In addition, when there is a valid subscription for the first M2M device and the computer program is run in the processor it also causes the CGW to allow the first M2M device network access, when the authentication response, comprising information about the successful authentication, is directed to the same M2M device that sent the authentication request, and the authentication response is signed by using the trusted certificate.

According to a third aspect, this disclosure provides a CGW capable to determine whether to allow a first M2M device network access. The CGW is adapted to intercept an authentication request of the first M2M device, where the authentication request is directed to a management service of the first M2M device, and where the authentication request comprises identity information of the first M2M device. The CGW is also adapted to intercept an authentication response, sent from a management service of M2M devices and directed to a second M2M device, where the authentication response comprises identity information of the second M2M device. The CGW is also adapted to check whether the authentication response is directed to the same M2M device that sent the authentication request. Further, the CGW is also adapted to check whether authentication of the first M2M device was successful, based on the intercepted authentication response. Further, the CGW is also adapted to check whether the authentication response is validly signed by the management service of M2M devices, and that a therefore used certificate is trusted by the CGW. Also, the CGW is adapted to check whether there is a valid subscription for the first M2M device. In addition, the CGW is adapted to allow the first M2M device network access, when there is a valid subscription for the first M2M device, and the authentication response, comprising information about the successful authentication, is directed to the same M2M device that sent the authentication request, and the authentication response is signed by using the trusted certificate.

According to a fourth aspect, this disclosure provides a CGW capable to determine whether to allow a first M2M device network access. This CGW comprises a first intercepting unit, a second intercepting unit, a checking unit, and an allowing unit. The first intercepting unit is adapted to intercept an authentication request of the first M2M device, where the authentication request is directed to a management service of the first M2M device, and where the authentication request comprises identity information of the first M2M device. The second intercepting unit is adapted to intercept an authentication response, sent from a management service of M2M devices and directed to a second M2M device, where the response comprises identity information of the second M2M device. The checking unit is adapted to check whether the authentication response is directed to the same M2M device that sent the authentication request. The checking unit also is adapted to check whether authentication of the first M2M device was successful, based on the intercepted authentication response. The checking unit is also adapted to check whether the authentication response is validly signed by the management service of M2M devices, and that a therefore used certificate is trusted by the CGW. In addition, the checking unit is also adapted to check whether there is a valid subscription for the first M2M device. In addition, the allowing unit is adapted to allow the first M2M device network access, when there is a valid subscription for the first M2M device, and the authentication response, comprising information about the successful authentication, is directed to the same M2M device that sent the authentication request, and the authentication response is signed by using the trusted certificate.

According to a fifth aspect, this disclosure provides a computer program that comprises instructions which, when executed on at least one processor, cause the at least one processor to carry out a method in a CGW for determining whether to allow a first M2M device network access. The method comprises intercepting an authentication request of the first M2M device, the authentication request being directed to a management service of the first M2M device, and wherein the authentication request comprises identity information of the first M2M device, and intercepting an authentication response, sent from a management service of M2M devices and directed to a second M2M device, the authentication response comprising identity information of the second M2M device. Also, the method comprises checking whether the authentication response is directed to the same M2M device that sent the authentication request. Also, the method comprises checking whether authentication of the first M2M device was successful, based on the intercepted authentication response. Also, the method comprises checking whether the authentication response is validly signed by the management service of M2M devices, and that a therefore used certificate is trusted by the CGW. In addition, the method comprises checking whether there is a valid subscription for the first M2M device. In addition, when there is a valid subscription for the first M2M device, and the authentication response comprising information about the successful authentication, is directed to the same M2M device that sent the authentication request, and the authentication response is signed by using the trusted certificate, the method comprises allowing the first M2M device network access.

It is an advantage with embodiments of the invention that a capillary gateway of the embodiments of the invention can provide low-powered devices, for example sensors, Internet reachability based on user or owner subscriptions in non-traditional scenarios.

Examples of non-traditional scenarios are typically the ones where devices are deployed straight out-of-the-box, i.e., without any customization of the devices. The device itself remains completely oblivious to changes in, for example, ownership or network operator.

The present disclosure presents a way to provide Internet access to devices using a significant degree of security.

BRIEF DESCRIPTION OF THE DRAWINGS

Embodiments will now be described in more detail, and with reference to the accompanying drawings, in which:

FIG. 1 illustrates a schematic network architecture related to this disclosure;

FIGS. 2 and 3 present signalling diagrams related to embodiments of this disclosure;

DETAILED DESCRIPTION

Figure 3:
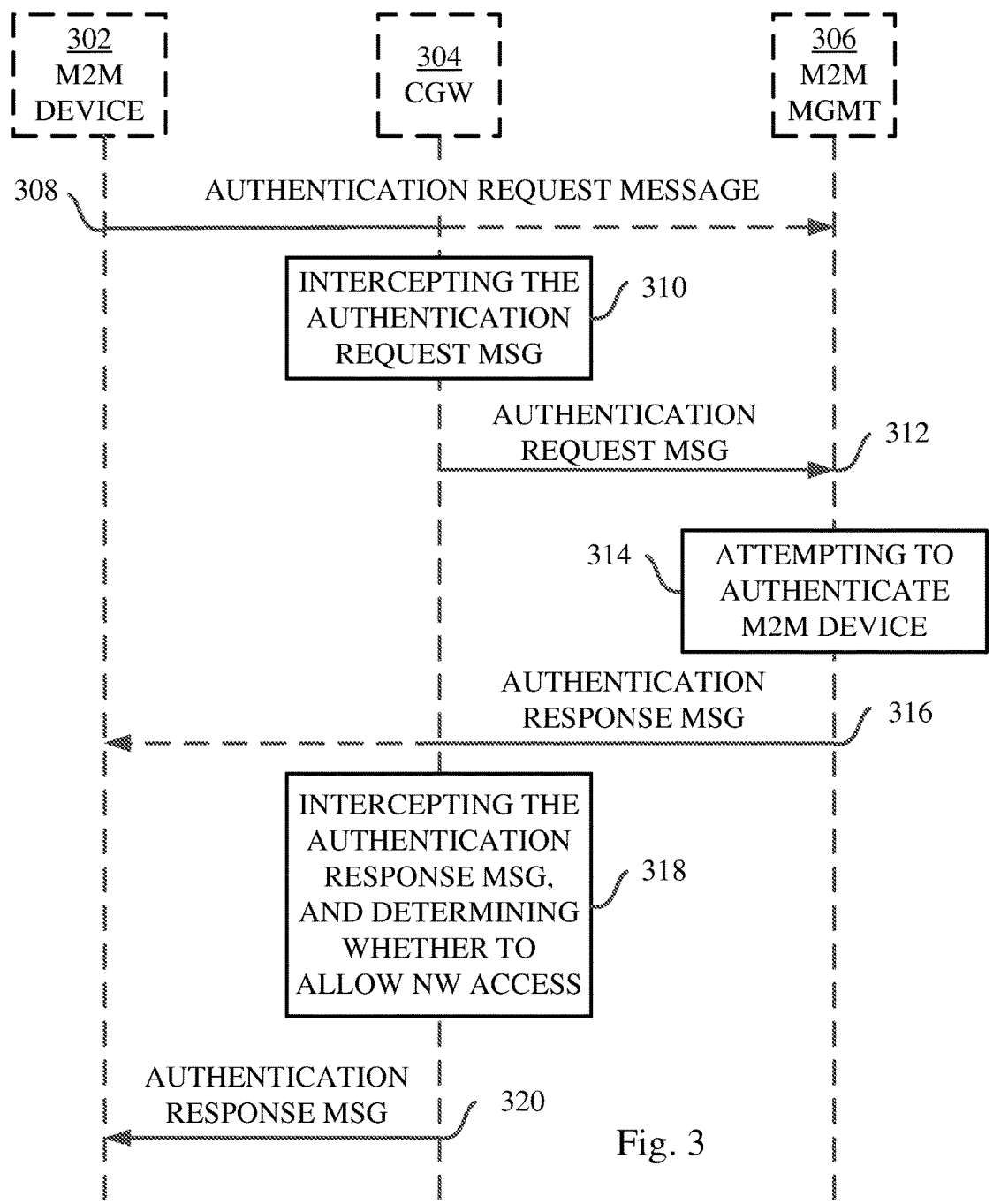

In the following description, different embodiments of the invention will be described in more detail, with reference to accompanying drawings. For the purpose of explanation and not limitation, specific details are set forth, such as particular examples and techniques in order to provide a thorough understanding.

FIG. 1 illustrates a schematic network architecture related to this disclosure. This architecture comprises an M2M device 102, a capillary gateway 104, a bootstrapping server 106, a capillary gateway (CGW) management server 108 and an M2M management service 110.

This disclosure describes procedures by which a capillary device can be authenticated by a CGW with minimal user interaction and requirements on the constrained device. One example of such a procedure is the bootstrapping procedure. Since devices can be authenticated, the CGW can choose to only serve authorized devices, i.e. devices having a service agreement with the CGW operator.

Some embodiments only of this disclosure rely on the usage of a bootstrapping server, with which the device has as an initial point of contact and which redirects a request by the device to its actual management service of the device. This disclosure provides a way to configure this redirection. The redirection may easily be configured by the device owner, or someone else, on behalf of the device owner.

This disclosure is based on the assumption that a single user can deploy many, even up to thousands of, devices.

In a vast deployment, it is not always feasible to assign each device for instance a public key certificate to prove the identity of the device. Also, for a CGW or similar device requiring to maintain access control lists (ACLs) or similar, the number of devices on the list could incur problems, especially considering that a device may also be mobile and change CGWs.

In contrast, within this disclosure the owner of the device may be assigned a public key certificate to prove the owner's identity and assume owner level service agreements between device owners and CGW operators. This means that any device belonging to the owner can be granted service from any CGW operator, but also from any CGW of the operator, with which the owner has a service agreement. Under these assumptions, the CGW, positioned between the device and services in the public network will forward traffic of all devices and be able to read the unencrypted content of traffic messages.

A device, when switched on, may attempt to bootstrap itself and connect to a bootstrapping server, which can redirect the device to an actual management portal for said device. The device would need to authenticate itself to the management portal. The device may also authenticate itself to the bootstrapping server.

As an alternative, the bootstrapping server may forward a message from the device being switched on, directly to the management portal of the device, which management portal then replies to the device.

In this disclosure, the CGW may learn the identity of the management portal through the communication between the device and the bootstrapping server. The CGW can then check whether the device gets authenticated by the management portal, or not.

Within some embodiments, there is a device owner certificate. The management portal may also grant this certificate, proving that the service knows the device owner. In this respect, the authentication of the device by the management portal can be considered to be performed by the device owner's part in the management portal, which again proves that the device owner knows the device. If the device is successful in authenticating itself, this means that the device is indeed owned by the device owner, which is trusted/verified by the management portal, through the owner's certificate in the portal.

Henceforth, the CGW then may only need to check whether the device owner is allowed to use the services of the CGW, which may be connectivity only.

It should be noted that in order to perform the bootstrapping, the device needs to be granted temporary connectivity, or network access, from the CGW.

In an IoT world with often tens of devices per owner, identifying devices solely on a per device basis may not be the best option. As outlined above, from an access authentication point of view it is argued that an important and feasible option is to identify who owns a specific device and to identify what services the owner is subscribed to.

FIG. 2 presents a signalling diagram of signalling between a M2M device 202, a CGW 204, a CGW management service 206 and a bootstrapping server (BS) 208. This assumes that the M2M device is preconfigured with an address of the BS 208.

In 210, the M2M device 202 accordingly directs a bootstrapping request message to the BS 208. In 212, the CGW 204 intercepts this request and determines whether the BS 208 is approved. If the BS is not approved by the CGW 204, the CGW 204 may send 214 an inquiry to the CGW management service 206 and ask whether the M2M device 202 is allowed to communicate with the BS 208. In 216, a response to the inquiry, such as Yes or No, may be received from the CGW 208. If the M2M device is not allowed to communicate with the BS 208, a bootstrapping response in the form of a bootstrapping request denied message is returned in 218 to the M2M device 202. However, in 220 if the M2M device 202 is allowed to communicate with the BS 208, the bootstrapping request is forwarded to the BS 208.

In 222, the BS 208 registers the M2M device 202 and returns a bootstrapping response message directed towards the M2M device, the message comprising an address of a M2M management service.

The bootstrapping response sent 224 from the BS 208 is intercepted by the CGW 204, which may verify a signature of the BS 208 to certify that the bootstrapping response is not modified by a third party. After a successful verification in 226, the bootstrapping response is forwarded to the M2M device 202, in 228.

The CGW may alternatively learn M2M management service information from a bootstrapping response and already then decide whether to allow eventual communication directed to the M2M management service.

It can be mentioned that the CGW 204 may allow temporarily network access to the M2M device 202 when sending the bootstrapping request only, in 210. The CGW may be preconfigured to associate the destination address, i.e. the BS 208 address with a bootstrapping server. The BS may thus be known to and accepted by the CGW in beforehand, making steps 214 and 216 obsolete.

The CGW 204 may ask the CGW management 206 whether the destination address of the bootstrapping request message is accepted. Alternatively, the CGW 204 may, as per a previously defined policy decision by the CGW management 206 allow all unknown addresses for a short period to cater a bootstrapping process. A communication access, limited in time and/or bandwidth, may be given to any M2M device to enable bootstrapping prior to performing authentication.

If the destination address is unknown, forbidden by a management decision, a management policy decision, or a temporary access has expired, all traffic from the M2M device being unknown is dropped. Effectively, access to the Internet is denied.

In 224, the CGW receives bootstrapping response message that is directed towards a M2M device 202. If the response message addresses a M2M device for which the CGW has not detected a bootstrapping request message, the CGW denies the traffic into the capillary network. If the bootstrapping response message is unknown or cannot be associated with any known device, the traffic may be dropped.

From the bootstrapping response message, the CGW can learn the M2M management service or portal of the M2M device. The CGW may now further extend a communication window comprising a set of allowed IP addresses of the M2M device to include also the management portal indicated in the message, and possibly prolong a time period therefore.

For security reasons, it is an advantage when the bootstrapping response message is signed by the server. In addition, a certificate allowing verification may be included in the bootstrapping response message. This way, both the CGW and the device may verify the authenticity of the bootstrapping reply message. The device may optionally have a BS certificate pre-installed together with other BS information, such as Internet protocol (IP) number or Uniform resource location (URL) address. A CGW may deny access if the bootstrapping reply message is not signed. Furthermore, additional requirements may apply, such as that the certificate used to sign the bootstrapping reply message has to be issued by trusted authorities. The list of trusted authorities may be defined by the CGW management.

FIG. 3 presents a signalling diagram of signalling between a M2M device 302, a CGW 304, and a M2M management service 306.

In 308, an authentication request message is directed towards the M2M management 306. In 310, the authentication request message is intercepted by the CGW 304.

It is noted that the CGW may here check whether the M2M management service is accepted. This step may be carried out when the bootstrapping response is received by the CGW in step 226.

In 312, the CGW directs the authentication request message to the M2M management service 306, provided that the M2M management service is accepted. Whether the M2M management service is accepted may depend on a policy at the CGW. Either all M2M management services are accepted or only a pre-defined set thereof is accepted. In the case that only a pre-defined set thereof is accepted, the CGW may learn a new management service of the device from the BS response message, and check with the CGW management portal if the new management service is OK and also add it to the pre-defined set.

In 314, the M2M management service attempts authenticating the M2M device 302. In 316, an authentication response message is directed towards the M2M device 302. In 318, the authentication response message is intercepted by the CGW 304, and determines whether to allow the M2M device network access. In 320, the CGW 304 sends an authentication response message to the M2M device 302.

The M2M device may be considered to attempt authenticating itself when sending the authentication request message. In 310 when the CGW intercepts the authentication request message the CGW may drop the authentication message unless the destination address of the message, i.e. the address of the M2M management service, has previously been white-listed.

It is noted that some M2M management services may be permanently whitelisted as of a policy decision, i.e. that their address is approved by the CGW 304.

In 316, the M2M management service portal sends an acknowledgement in the form of an authentication message response indicating whether the authentication of the M2M device 302 was successful or not.

The CGW 304, upon intercepting this authentication response message, may check if the authentication is indeed successful. For the CGW 304 to be able to reliably trust the information authentication response message, said authentication response message should contain at least:

Information whether the M2M device is successfully authenticated or not, i.e. a status of the authentication procedure, for instance "ok", "failed", or any standard defined code for the former, such as 200 in case of hypertext transfer protocol (HTTP).

A M2M device identifier, which the CGW has been keeping track of throughout the authentication to determine whether the identifier used by the device is also the identifier of the M2M device being authenticated by the M2M management service. In some cases, the Internet protocol (IP) address of the M2M device may be used.

The identity of the M2M management service in order to identify the M2M management service. By receiving an authentication response message that is signed by a M2M management service, it can be revealed both the identity of the M2M management service as well as that the authentication response message was not modified between the M2M management service and the CGW. The CGW may verify the signature of the M2M management service by using the management service's certificate, which implicitly provides also the service's identity.

Also, in the alternative where access is granted based on device owner, the authentication response message should also include the identity of the owner of the M2M device or subscriber. This information may be gained from a certificate generated by the M2M management service for the M2M device owner or authorized user of the M2M device.

As mentioned above, the authentication response message can be signed by the M2M management service, which certifies that the contents of the authentication response message was not modified, again if the certificate used for signing can be verified, and that it is therefore correct. Based upon this information, the CGW can make a decision whether the M2M device should be allowed to access the internet freely.

However, if either the signature or the certificate with which the authentication response message is signed cannot be verified, the CGW may discard the packets of the authentication response message instead of forwarding it to the M2M device.

If the CGW has neither any information about the M2M device owner nor any information about the M2M device cached locally, the CGW may connect to the CGW management server to receive assistance in making a decision regarding the M2M device. The CGW may inform the CGW management server that a M2M device has been indicated and provide identification information of the M2M device, such as M2M device identifier, M2M device owner identifier and/or information about the M2M management service that has authenticated the M2M device, to CGW management server.

If the M2M device owner is listed at the management server portal of the CGW as a subscriber of the CGW service, the management server portal of the CGW may inform the CGW that the device is allowed to be served. If the owner has a subscription for N number of devices, it can be checked that the subscription quota is not full, i.e. there is room for said device. The CGW may now permanently whitelist the M2M device and allow all its traffic.

In the case of device identity based access control, the management server portal of the CGW can check whether the identity of the device is listed therein. If it is listed therein the management server portal the CGW management service may inform the CGW that the device is allowed to be served.

Alternatively, in the case of M2M management service identity based access control, the management server portal of the CGW can check whether the M2M management service identity is listed therein. If the M2M management service identity is listed therein, the management server portal of the CGW may inform the CGW that the device is allowed to be served.

If another M2M device of the same owner is later attached to the same CGW, the CGW may first intercept an authentication response message of said another M2M device and determine, after verification of the signature and the certificate with which said authentication response message is signed, that the authentication response message is authenticated. If said another M2M device belongs to the same owner that the CGW already has information about and knows, it can thus directly whitelist said another M2M device.

It is noted that the CGW may then report the added M2M device to the management portal of the CGW to keep track of the usage of the subscription quota, i.e. not to have more devices connected to the network than what is agreed upon in the subscription. Thus both the owner identity and the M2M device ID may be communicated to the management server of the CGW.

In addition, there may of course be additional information piggybacked on the authentication response messages, such as nonces and timestamps to provide freshness.

A user certificate for the M2M device owner may hence be used in the M2M management service. It is however, not a necessity for the bootstrapping to use a user certificate for the M2M device owner in the M2M management service. Any identity that the M2M management service can provide in an authentication response indicating an authenticated M2M device, i.e. "authentication OK" message, which can be mapped to a subscriber of the CGW connectivity or accessibility, may be sufficient since the M2M management service signs the OK message and certifies that the message is correct, provided the signature and the certificate used for signing can be verified by the CGW.

It is noted that subscriber may here denote any one of the device, the device owner or the M2M management service.

However, for future use the user certificate becomes important, e.g. when pushing commands from the M2M management service to the M2M device it would be good that the commands are signed by the M2M device owner and not by the M2M management service. This is important when wanting to reduce the signalling for setting up a secure communication channel from the M2M management service to the M2M device and/or if the M2M device is sleeping and utilizing a "mailbox" for getting commands, i.e. polling for commands from the mailbox, which could be the M2M management service.

This disclosure may be applied with various authentication mechanisms, of which one is Generic bootstrapping architecture (GB A), 3GPP TS 33.220).

Figure 4:
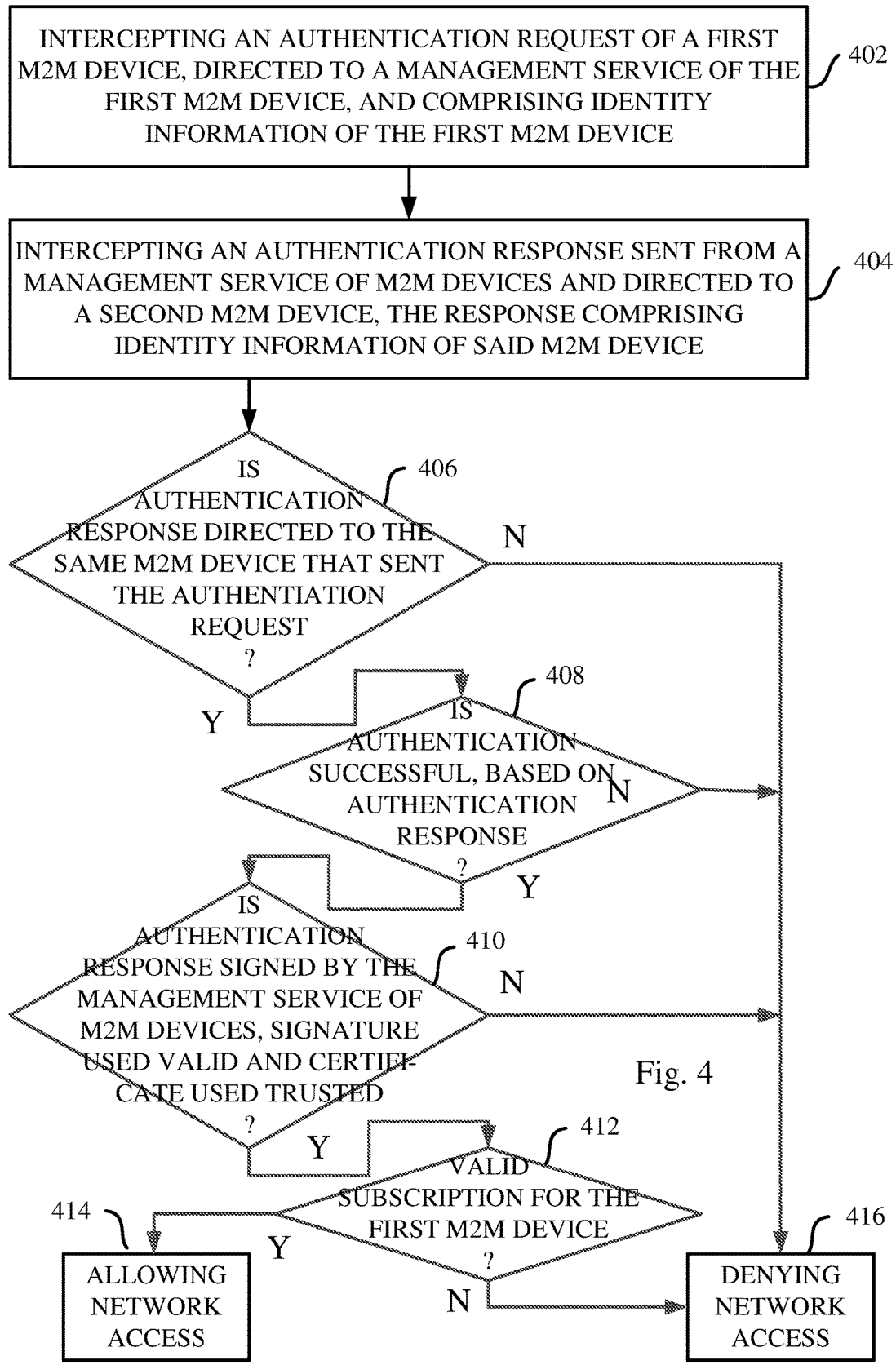
FIG. 4 presents a flow diagram of a method according to embodiments of this disclosure.

With reference to FIG. 4 a flow chart of a method in a CGW 204, 304 for determining whether to allow a first M2M device 202, 302 network access.

In 402, the method comprises intercepting 402 an authentication request of the first M2M device, the authentication request being directed to a management service of the first M2M device, and wherein the authentication request comprises identity information of the first M2M device.

In 404, the method comprises intercepting 404 an authentication response, sent from a management service of M2M devices and directed to a second M2M device, the authentication response comprising identity information of the second M2M device.

In 406, the method comprises checking whether the authentication response is directed to the same M2M device that sent the authentication request. If the authentication response is directed to the same M2M device that sent the authentication request, the following task is 408. If the authentication response is not directed to the same M2M device that sent the authentication request, the following task is 416.

In 408, the method comprises checking whether authentication of the first M2M device was successful, based on the intercepted authentication response. If the authentication of the first M2M device is successful, i.e., that the first M2M device is authenticated, the following task is 410. If the authentication of the first M2M device is unsuccessful, i.e., that the first M2M device is not authenticated, the following task is 416.

In 410, the method comprises checking whether the authentication response is validly signed by the management service of M2M devices, and that a therefore used certificate is trusted by the CGW. If the authentication response is signed by the management service of M2M devices, and the signature and the certificate with which the authentication response is signed are verified by the CGW, the following task is 412. If the authentication response is not signed by the management service of M2M devices, or the authentication response is signed by the management service of M2M devices but the certificate with which the authentication response is signed is not trusted by the CGW, the following task is 416.

In 412, the method comprises checking whether there is a valid subscription for the first M2M device. If there is a valid subscription for the first M2M device, the following step is 414. If there is no valid subscription for the first M2M device, the next step is 416.

In 414 when there is a valid subscription for the first M2M device and the authentication response, comprising information about the successful authentication, is directed to the same M2M device that sent the authentication request, and the authentication response is signed by using the verified certificate, the method comprises allowing the first M2M device network access.

In 416, the method comprises denying the first M2M device network access freely, i.e. non-temporarily.

Intercepting 310, 402 the authentication request in the method in a CGW 204, 304 for determining whether to allow a first M2M device 202, 302 network access, may also comprise intercepting an ownership request message and wherein intercepting 316, 404 the authentication response comprises intercepting an ownership response message, wherein the ownership refers to the first M2M device.

Checking 412 whether there is a valid subscription for the first M2M device, within the method in a CGW 204, 304 for determining whether to allow a first M2M device 202, 302 network access, may comprise checking whether the identity of the first M2M device is an accepted service subscriber of the CGW.

Checking 412 whether there is a valid subscription for the first M2M device may comprise checking whether the identity of the first M2M device owner is an accepted service subscriber of the CGW.

Checking 412 whether there is a valid subscription for the first M2M device, may comprise checking whether the identity of the M2M management service is an accepted service subscriber of the CGW Checking 410 whether the authentication response is signed, may comprise checking the identity of the management service of M2M devices and using the certificate of that identity for verifying the signature.

The method may further comprise checking whether the authentication response is signed by using a certificate of an owner of the first M2M device and issued by the management service of M2M devices.

In addition, the method may further comprise prior to intercepting an authentication request message, intercepting a bootstrapping request sent from the first M2M device and directed to a bootstrapping service; checking 212 whether the bootstrapping service is approved, based on predefined information on approved bootstrapping services; and checking 214, 216 whether the first M2M device is allowed to communicate with the bootstrapping service; and forwarding 220 the bootstrapping request to the bootstrapping service when the bootstrapping service is approved, and the first M2M device is allowed to communicate with the bootstrapping service.

In addition, the method may further comprise intercepting a bootstrapping response received from a bootstrapping service, checking 226 whether the bootstrapping response is received from the same bootstrapping service to which the bootstrapping request was directed, and when the bootstrapping response is received from the same bootstrapping service to which the bootstrapping request was directed, forwarding 228 the bootstrapping response to the first M2M device.

Also, the method, wherein the bootstrapping response indicates a M2M management service of the first M2M device, may further check whether the M2M management service is accepted by the CGW or by a CGW management portal, and if it is accepted, allow the first M2M device to communicate with the M2M management service.

The present disclosure also comprises a CGW 204, 304 capable to determine whether to allow a first M2M device 202, 302 network access. The CGW is adapted to intercept 310, 402 an authentication request of the first M2M device, where the authentication request is directed to a management service of the first M2M device, and where the authentication request comprises identity information of the first M2M device. The CGW is also adapted to intercept 316, 404 an authentication response, sent from a management service of M2M devices and directed to a second M2M device, where the authentication response comprises identity information of the second M2M device. The CGW is also adapted to check 406 whether the authentication response is directed to the same M2M device that sent the authentication request. Further, the CGW is also adapted to check 408 whether authentication of the first M2M device was successful, based on the intercepted authentication response. Further, the CGW is also adapted to check 410 whether the authentication response is validly signed by the management service of M2M devices, and that a therefore used certificate is trusted by the CGW. Also, the CGW is adapted to check 412 whether there is a valid subscription for the first M2M device. In addition, the CGW is adapted to allow 414 the first M2M device network access, when there is a valid subscription for the first M2M device and the authentication response, comprising information about the successful authentication, is directed to the same M2M device that sent the authentication request and that the authentication response is signed by using the trusted certificate.

The CGW 204, 304 may further be adapted to intercept an ownership request message of the first M2M device and adapted to intercepting an ownership response message sent from the management service of M2M devices.

The CGW 204, 304 may further be adapted to check whether the identity of the first M2M device is an accepted service subscriber of the CGW.

The CGW 204, 304 may further be adapted to check whether the identity of the first M2M device owner is an accepted service subscriber of the CGW.

The CGW 204, 304 may further be adapted to check whether the identity of the M2M management service is an accepted service subscriber of the CGW.

The CGW 204, 304 may further be adapted to check the identity of the management service of M2M devices, and to use the certificate of that identity for verifying the signature.

The CGW 204, 304 may further be adapted to check whether the authentication response is signed by using a certificate of an owner of the first M2M device and issued by the management service of M2M devices.

Also, the CGW 204, 304 may further be adapted to determine that the first M2M device and the second M2M device are the same.

It is noted that the signature when signing of the authentication response may be verified by the certificate of the M2M management service.

The CGW 204, 304 may further be adapted, prior to any of the preceding steps, to intercept a bootstrapping request sent from the first M2M device and directed to a bootstrapping service; to check 212 whether the bootstrapping service is approved, based on predefined information on approved bootstrapping services; to check 214, 216 whether the first M2M device is allowed to communicate with the bootstrapping service; and to forward 220 the bootstrapping request to the bootstrapping service when the bootstrapping service is approved, and the first M2M device is allowed to communicate with the bootstrapping service.

The CGW 204, 304 may also be adapted to intercept a bootstrapping response received from a bootstrapping service, to check 226 whether the bootstrapping response is received from the same bootstrapping service to which the bootstrapping request was directed, and when the bootstrapping response is received from the same bootstrapping service to which the bootstrapping request was directed, to forward 228 the bootstrapping response to the first M2M device.

In addition, the CGW 204, 304 may further be adapted to check whether the M2M management service is accepted by the CGW or by a CGW management portal, and if it is accepted, allow the first M2M device to communicate with the M2M management service, based on the bootstrapping response indicating a M2M management service of the first M2M device.

The present disclosure also comprises a computer program that comprises instructions which, when executed on at least one processor, cause the at least one processor to carry out the method in a CGW 204, 304 for determining whether to allow a first M2M device 202, 302 network access, or not. The method comprises intercepting 310, 402 an authentication request of the first M2M device, the authentication request being directed to a management service of the first M2M device, and wherein the authentication request comprises identity information of the first M2M device, and intercepting 316, 404 an authentication response, sent from a management service of M2M devices and directed to a second M2M device, the authentication response comprising identity information of the second M2M device. Also, the method comprises checking 406 whether the authentication response is directed to the same M2M device that sent the authentication request. Also, the method comprises checking 408 whether authentication of the first M2M device was successful, based on the intercepted authentication response. Also, the method comprises checking 410 whether the authentication response is validly signed by the management service of M2M devices, and that a therefore used certificate is trusted by the CGW. Also, the method comprises checking 412 whether there is a valid subscription in the CGW for the first M2M device. In addition, when there is a valid subscription for the first M2M device, and the authentication response, comprising information about the successful authentication, is directed to the same M2M device that sent the authentication request, and the authentication response is signed by using the trusted certificate, the method comprises allowing 414 the first M2M device network access.

Figure 5:
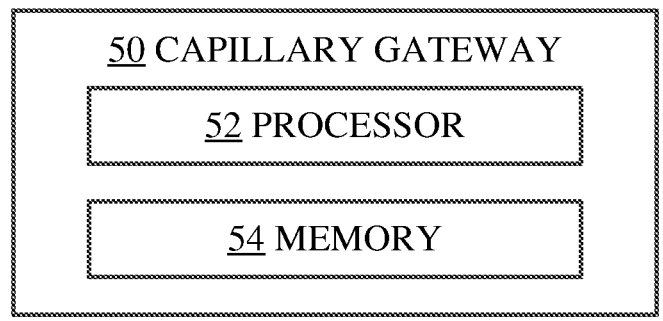
FIGS. 5 and 6 schematically present a capillary gateway according to embodiments of this disclosure.

FIG. 5 schematically presents a CGW 50 capable to determine whether to allow a first M2M device network access. The CGW 50 comprises a processor 52 and a memory 54 that stores a computer program comprising computer program code which when run in the processor, causes the CGW to intercept 310, 402 an authentication request of the first M2M device, where the authentication request is directed to a management service of the first M2M device, and where the authentication request comprises identity information of the first M2M device. It also causes the CGW to intercept 316, 404 an authentication response, sent from a management service of M2M devices and directed to a second M2M device, where the response comprises identity information of the second M2M device. When the computer program is run in the processor 52 it also causes the CGW to check 406 whether the authentication response is directed to the same M2M device that sent the authentication request. Furthermore, it also causes the CGW to check 408 whether authentication of the first M2M device was successful, based on the intercepted authentication response. Also, when the computer program is run in the processor 52 it also causes the CGW to check 410 whether the authentication response is signed by the management service of M2M devices, the signature is valid and that a therefore used certificate is trusted by the CGW. Also, when the computer program is run in the processor 52 it also causes the CGW to check 412 whether there is a valid subscription in the CGW for the first M2M device. In addition, when the computer program is run in the processor 52 it also causes the CGW to allow 414 the first M2M device network access, when the authentication response, comprising information about the successful authentication, is directed to the same M2M device that sent the authentication request and that the authentication response is signed by using the trusted certificate.

Figure 6:
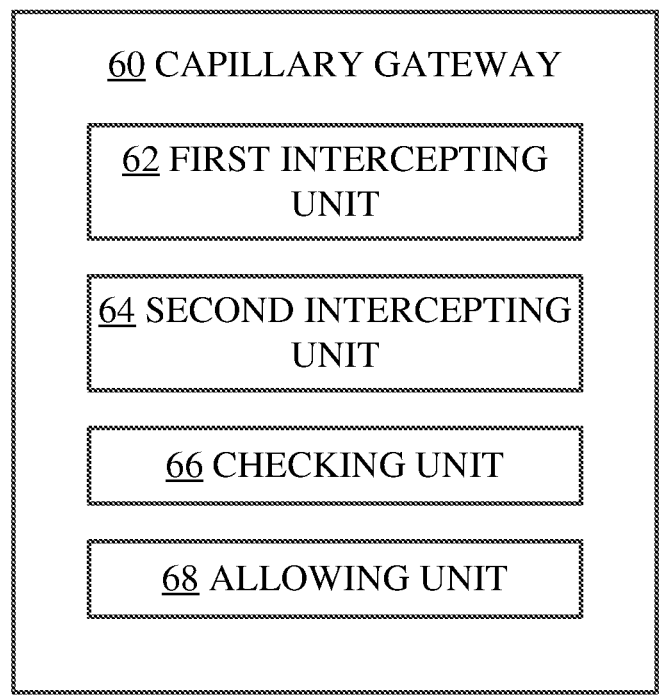

FIG. 6 schematically presents a CGW 60 capable to determine whether to allow a first M2M device network access. The CGW comprises a first intercepting unit 62, a second intercepting unit 64, a checking unit 66, and an allowing unit 68. The first intercepting unit 62 is adapted to intercept 310, 402 an authentication request of the first M2M device, where the authentication request is directed to a management service of the first M2M device, and where the authentication request comprises identity information of the first M2M device. The second intercepting unit 64 is adapted to intercept 316, 404 an authentication response, sent from a management service of M2M devices and directed to a second M2M device, where the response comprises identity information of the second M2M device. The checking unit 66 is adapted to check 406 whether the authentication response is directed to the same M2M device that sent the authentication request. The checking unit 66 is further adapted to check 408 whether authentication of the first M2M device was successful, based on the intercepted authentication response. The checking unit 66 is also adapted to check 410 whether the authentication response is validly signed by the management service of M2M devices, and that a therefore used certificate is trusted by the CGW.

In addition, the checking unit 66 is also adapted to check 412 whether there is a valid subscription for the first M2M device. In addition, the allowing unit 68 is adapted to allow 414 the first M2M device network access, when there is a valid subscription for the first M2M device and the authentication response, comprising information about the successful authentication, is directed to the same M2M device that sent the authentication request, and the authentication response is signed by using the trusted certificate.

It is noted that the checking unit 66 may be divided into several checking units, each of which being adapted to perform a checking step. Similarly, the first intercepting unit 62 and the second intercepting unit 64 may comprised within a single intercepting unit.

The present disclosure has the following advantages:

A CGW of this disclosure can provide low-powered devices, for example sensors, Internet reachability based on user subscriptions in non-traditional scenarios such as where devices are deployed straight out-of-the-box, i.e., without any customization. The device itself remains completely oblivious to changes in, for example, ownership or network operator.

This disclosure securely provides Internet reachability based on user subscriptions in non-traditional scenarios such as where devices are deployed straight out-of-the-box, i.e., without any customization. This is in contrast to insecure prior art techniques.

It may be further noted that the above described embodiments are only given as examples and should not be limiting to the present invention, since other solutions, uses, objectives, and functions are apparent within the scope of the invention as claimed in the accompanying patent claims.

ABBREVIATIONS

3GPP 3$^{rd}$ generation partnership project
CGW capillary gateway
GBA generic bootstrapping architecture
HTTP hypertext transfer protocol
IoT Internet of things
IP Internet protocol
M2M machine-to-machine
NAF network application function
RDM remote device manager
SEP service enablement platform
UE user equipment
URL uniform resource location
WLAN wireless local area network

The invention claimed is:

1. A method in a capillary gateway (CGW) for determining whether to allow a first machine-to-machine (M2M) device network access, the method comprising:
   intercepting an authentication request of the first M2M device, the authentication request being directed to a management service of the first M2M device, and wherein the authentication request comprises identity information of the first M2M device;
   intercepting an authentication response, sent from a management service of M2M devices and directed to a second M2M device, the authentication response comprising identity information of the second M2M device;
   checking whether the authentication response is directed to the same M2M device that sent the authentication request;
   checking whether authentication of the first M2M device was successful, based on the intercepted authentication response;
   checking whether the authentication response is validly signed by the management service of M2M devices, and whether a certificate used for signing the authentication response is trusted by the CGW;
   checking whether there is a valid subscription in the CGW for the first M2M device; and
   allowing the first M2M device network access, when there is a valid subscription for the first M2M device, and the authentication response, comprising information about the successful authentication, is directed to the same M2M device that sent the authentication request, and the authentication response is signed by using the trusted certificate.

2. The method according to claim 1, wherein intercepting the authentication request comprises intercepting an ownership request message and wherein intercepting the authentication response comprises intercepting an ownership response message.

3. The method according to claim 1, wherein checking whether there is a valid subscription for the first M2M device, comprises checking whether the identity of the first M2M device is an accepted service subscriber of the CGW.

4. The method according to claim 1, wherein checking whether there is a valid subscription for the first M2M device, comprises checking whether the identity of the first M2M device owner is an accepted service subscriber of the CGW.

5. The method according to claim 1, wherein checking whether there is a valid subscription for the first M2M device, comprises checking whether the identity of the M2M management service is an accepted service subscriber of the CGW.

6. The method according to claim 1, wherein checking whether the authentication response is signed, comprises checking the identity of the management service of M2M devices and using the certificate of that identity for verifying the signature.

7. The method according to claim 1, comprising checking whether the authentication response is signed by using a certificate of an owner of the first M2M device and issued by the management service of M2M devices.

8. The method according to claim 1, further comprising determining that the first M2M device and the second M2M device are the same.

9. The method according to claim 1, further comprising prior to any of the preceding steps, intercepting a bootstrapping request sent from the first M2M device and directed to a bootstrapping service; checking whether the bootstrapping service is approved, based on predefined information on approved bootstrapping services; and checking whether the first M2M device is allowed to communicate with the bootstrapping service; and forwarding the bootstrapping request to the bootstrapping service when the bootstrapping service is approved, and the first M2M device is allowed to communicate with the bootstrapping service.

10. The method according to claim 9, further comprising intercepting a bootstrapping response received from a bootstrapping service, checking whether the bootstrapping response is received from the same bootstrapping service to which the bootstrapping request was directed, and forwarding the bootstrapping response to the first M2M device, when the bootstrapping response is received from the same bootstrapping service to which the bootstrapping request was directed.

11. The method according to claim 9, wherein the bootstrapping response indicates a M2M management service of the first M2M device, and the method further comprises checking whether the M2M management service is accepted by the CGW or by a CGW management portal, and allowing the first M2M device to communicate with the M2M management service, if the M2M management service is accepted.

12. A computer program product comprising a non-transitory computer readable medium including a computer program, comprising instructions which, when executed on at least one processor, cause the at least one processor to carry out a method in a capillary gateway (CGW) for determining whether to allow a first machine-to-machine (M2M) device network access, the method comprising:
   intercepting an authentication request of the first M2M device, the authentication request being directed to a management service of the first M2M device, and wherein the authentication request comprises identity information of the first M2M device;
   intercepting an authentication response, sent from a management service of M2M devices and directed to a second M2M device, the authentication response comprising identity information of the second M2M device;
   checking whether the authentication response is directed to the same M2M device that sent the authentication request;

checking whether authentication of the first M2M device was successful, based on the intercepted authentication response;

checking whether the authentication response is validly signed by the management service of M2M devices, and whether a certificate used for signing the authentication response is trusted by the CGW;

checking whether there is a valid subscription in the CGW for the first M2M device; and allowing the first M2M device network access, when there is a valid subscription for the first M2M device, and the authentication response, comprising information about the successful authentication, is directed to the same M2M device that sent the authentication request, and the authentication response is signed by using the trusted certificate.

13. A capillary gateway (CGW) capable to determine whether to allow a first machine-to-machine (M2M) device network access, the CGW being adapted to:

intercept an authentication request of the first M2M device, where the authentication request is directed to a management service of the first M2M device, and where the authentication request comprises identity information of the first M2M device;

intercept an authentication response, sent from a management service of M2M devices and directed to a second M2M device, where the authentication response comprises identity information of the second M2M device;

check whether the authentication response is directed to the same M2M device that sent the authentication request;

check whether authentication of the first M2M device was successful, based on the intercepted authentication response;

check whether the authentication response is validly signed by the management service of M2M devices, and whether a certificate used for signing the authentication responses is trusted by the CGW;

check whether there is a valid subscription in the CGW for the first M2M device; and allow the first M2M device network access, when there is a valid subscription for the first M2M device, and the authentication response, comprising information about the successful authentication, is directed to the same M2M device that sent the authentication request, and the authentication response is signed by using the trusted certificate.

14. The CGW according to claim 13, further being adapted to intercept an ownership request message of the first M2M device and adapted to intercepting an ownership response message sent from the management service of M2M devices.

15. The CGW according to claim 13, further being adapted to check whether the identity of the first M2M device is an accepted service subscriber of the CGW.

16. The CGW according to claim 13, further being adapted to check whether the identity of the first M2M device owner is an accepted service subscriber of the CGW.

17. The CGW according to claim 13, further being adapted to check whether the identity of the M2M management service is an accepted service subscriber of the CGW.

18. The CGW according to claim 13, further being adapted to check the identity of the management service of M2M devices, and to use the certificate of that identity for verifying the signature.

19. The CGW according to claim 13, further being adapted to check whether the authentication response is signed by using a certificate of an owner of the first M2M device and issued by the management service of M2M devices.

20. The CGW according to claim 13, further being adapted to determine that the first M2M device and the second M2M device are the same.

21. The CGW according to claim 13, the CGW further being adapted, prior to any of the preceding steps, to intercept a bootstrapping request sent from the first M2M device and directed to a bootstrapping service; to check whether the bootstrapping service is approved, based on predefined information on approved bootstrapping services; to check whether the first M2M device is allowed to communicate with the bootstrapping service; and to forward the bootstrapping request to the bootstrapping service when the bootstrapping service is approved, and the first M2M device is allowed to communicate with the bootstrapping service.

22. The CGW according to claim 21, further being adapted to intercept a bootstrapping response received from a bootstrapping service; to check whether the bootstrapping response is received from the same bootstrapping service to which the bootstrapping request was directed, and to forward the bootstrapping response to the first M2M device, when the bootstrapping response is received from the same bootstrapping service to which the bootstrapping request was directed.

23. The CGW according to claim 20, further being adapted to check whether the M2M management service is accepted by the CGW or by a CGW management portal, and to allow the first M2M device to communicate with the M2M management service, based on the bootstrapping response indicating a M2M management service of the first M2M device, if the M2M management service is accepted.

24. A capillary gateway (CGW) capable to determine whether to allow a first machine-to-machine (M2M) device network access, the CGW comprising a first intercepting unit, a second intercepting unit, a checking unit, and an allowing unit, wherein the first intercepting unit is adapted to intercept an authentication request of the first M2M device, where the authentication request is directed to a management service of the first M2M device, and where the authentication request comprises identity information of the first M2M device; wherein the second intercepting unit is adapted to intercept an authentication response, sent from a management service of M2M devices and directed to a second M2M device, where the response comprises identity information of the second M2M device; wherein the checking unit is adapted to check whether the authentication response is directed to the same M2M device that sent the authentication request; wherein the checking unit is also adapted to check whether authentication of the first M2M device was successful, based on the intercepted authentication response; wherein the checking unit further is adapted to check whether the authentication response is validly signed by the management service of M2M devices, and whether a certificate used for signing the authentication response is trusted by the CGW; wherein the checking unit also is adapted to check whether there is a valid subscription in the CGW for the first M2M device; and wherein the allowing unit is adapted to allow the first M2M device network access, when there is a valid subscription for the first M2M device, and the authentication response, comprising information about the successful authentication, is directed to the same M2M device that sent the authentication request, and the authentication response is signed by using the verified certificate.

25. A capillary gateway (CGW) capable to determine whether to allow a first machine-to-machine (M2M) device network access, the CGW comprising:
- a processor; and
- a memory storing a computer program comprising computer program code which when run in the processor, causes the CGW to:
- intercept an authentication request of the first M2M device, where the authentication request is directed to a management service of the first M2M device, and where the authentication request comprises identity information of the first M2M device;
- intercept an authentication response, sent from a management service of M2M devices and directed to a second M2M device, where the response comprises identity information of the second M2M device;
- check whether the authentication response is directed to the same M2M device that sent the authentication request;
- check whether authentication of the first M2M device was successful, based on the intercepted authentication response;
- check whether the authentication response is validly signed by the management service of M2M devices, and whether a certificate used for signing the authentication response is trusted by the CGW;
- check whether there is a valid subscription in the CGW for the first M2M device; and
- allow the first M2M device network access, when there is a valid subscription for the first M2M device, and the authentication response, comprising information about the successful authentication, is directed to the same M2M device that sent the authentication request, and the authentication response is signed by using the trusted certificate.

* * * * *